(No Model.)
W. COURTENAY.
NUT LOCK.
No. 267,329.   Patented Nov. 14, 1882.
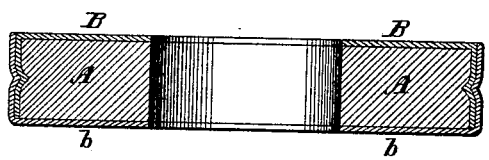
Attest:
Courtney A. Cooper
William Paxton
Wm Courtenay
Inventor:
By Chas E. Foster
Atty.

UNITED STATES PATENT OFFICE.

WILLIAM COURTENAY, OF NEW YORK, N. Y.

NUT-LOCK.

SPECIFICATION forming part of Letters Patent No. 267,329, dated November 14, 1882.

Application filed October 5, 1882. (No model.)

*To all whom it may concern:*

Be it known that I, WILLIAM COURTENAY, of the city, county, and State of New York, have invented a new and Improved Composite Washer or Nut-Lock, of which the following is a full, true, and exact description, reference being had to the drawing, which shows a section view of a nut-lock or washer constructed after my invention.

Referring to Letters Patent No. 256,642, granted to me April 18, 1882, my present invention is a modification of the washer therein shown, and differs from it in having two flanged caps of flexible metal, one on each side of the yielding body, and the edges or flanges of which overlap each other, as shown in the drawing.

A is the body, of fiber or other yielding material. B is a flanged cap, of flexible metal, such as is shown in the said patent; and *b* is a similar cap, placed upon the opposite or under side of the body A, and the flange of which is sufficiently long to overlap or be overlapped by the cap B. The body A being placed between the two caps, the whole is secured together by pinching or crimping, in the precise manner shown in my said patent, or in some other suitable and similar manner.

It will, however, be found that when the caps overlap each other in this manner they will sufficiently bind each other and the washer to need for some purposes no other locking or securing device than their own friction.

Either cap may overlap the other and either flange may be made the longest, or they may be made of the same length, provided one overlaps the other; and the method of securing the caps, if any is used, must be such as will permit the flanges to overlap directly and not by a bending of one around the edges of the other.

I do not in this application claim the duplication of the caps, broadly nor—except when their flanges overlap—directly; but What I do claim is—

The compound nut-lock having an elastic or yielding body inclosed between two flexible metallic caps whose edges or flanges overlap without being bent around each other.

WILLIAM COURTENAY.

Witnesses.
CHARLES H. LUSCOMB,
LUKE MADIGAN.